United States Patent

Kanda et al.

[11] Patent Number: 5,974,871
[45] Date of Patent: Nov. 2, 1999

[54] TENSION MEASURING APPARATUS AND METHOD FOR PISTON RING

[75] Inventors: Hiroyuki Kanda; Takeshi Kuwahara, both of Kashiwazaki, Japan

[73] Assignee: Kabushiki Kaisha Riken, Tokyo, Japan

[21] Appl. No.: 09/049,468

[22] Filed: Mar. 27, 1998

[30] Foreign Application Priority Data

May 9, 1997 [JP] Japan .................................. 9-136012

[51] Int. Cl.[6] .................................................. G01M 15/00
[52] U.S. Cl. ................................................ 73/120; 73/826
[58] Field of Search ................................ 73/120, 9, 826, 73/828, 831, 849, 856

[56] References Cited

U.S. PATENT DOCUMENTS

| | | |
|---|---|---|
| 3,946,602 | 3/1976 | Huntington et al. . |
| 4,520,660 | 6/1985 | Hitchcock ................................. 73/120 |
| 5,007,284 | 4/1991 | Slone ....................................... 73/120 |
| 5,258,930 | 11/1993 | Fukuyoshi et al. ....................... 702/38 |

OTHER PUBLICATIONS

Patent Abstracts of Japan, vol. 011, No. 062 (P–551), Feb. 25, 1987 and JP 61 226624 A (Riken Corp.), Oct. 8,. 1986.
Patent Abstracts of Japan, vol. 095, No. 008, Sep. 29, 1995 and JP 07 128162 A (Mitsubishi Motors Corp.), May 19, 1995.
Patent Abstracts of Japan, vol. 008, No. 097 (P–272), May 8, 1984 and JP 59 010826 A (Toyota Jidosha Kogyo KK), Jan. 20, 1984.

*Primary Examiner*—Max Noori
*Attorney, Agent, or Firm*—Hopgood, Calimafde, Kalil & Judlowe, LLP

[57] ABSTRACT

An impact and a vibration are applied to a portion of a piston ring on which a belt body is wound, and a vibration is also applied to the belt body. A position where a desired tension can be obtained is obtained by using a master gauge having an outer diameter equal to the inner diameter of a cylinder, and the like. When measuring the tension, a measuring mechanism is moved to this position. The frictional force between the piston ring and the belt body can be considerably decreased, and a closed gap need not be measured every time measurement is performed. Accordingly, the tension of the piston ring can be stably measured at high precision within a short period of time.

6 Claims, 4 Drawing Sheets

TENSION MEASURING APPARATUS AND METHOD FOR PISTON RING

BACKGROUND OF THE INVENTION

1. Field of the Invention

The present invention relates to a tension measuring apparatus and method for a piston ring mounted on a piston and inserted in the cylinder of an internal combustion engine or the like.

2. Description of the Prior Art

A piston ring must have a predetermined tension in order to apply a predetermined surface pressure to the inner circumferential surface of a cylinder when the piston ring is mounted on a piston and inserted in the cylinder of an internal combustion engine or the like. For this reason, the tension of the piston must be measured. For the measurement, a thin steel belt or the like is wound on the piston ring, and a tensile force is applied to the steel belt to reduce the diameter of the piston ring. When the diameter of the piston ring is reduced until the closed gap reaches a value at the cylinder insertion state, the applied tensile force is determined as the tension of the piston ring.

According to the first conventional case to measure a tension of a piston ring, an impact or a vibration is applied to the piston ring and the thin steel belt at the wound portion to remove the frictional force between them. The diameter of the piston ring is reduced until the closed gap reaches a value obtained in advance in a reference ring gauge. The tensile force applied at this time is measured by a load cell, a spring balancer, or the like.

According to the second conventional case to measure a tension of a piston ring (e.g., Japanese Utility Model Publication No. 2-667), a vibration is applied to the piston ring and the thin steel belt at the wound portion to remove the frictional force between them, and the length of the thin steel belt is adjustable. Once the length of the thin steel belt is set to obtain a predetermined closed gap, the predetermined closed gap is obtained automatically.

In any of the first and second conventional cases described above, since vibration or the like is applied to only the piston ring and the thin steel belt at the wound portion to remove the frictional force between them, the frictional force cannot be removed sufficiently. Therefore, the measured tension varies largely, and it is difficult to stably measure the tension of the piston ring at high precision.

In any of the first and second conventional cases described above, the closed gap of the piston ring must be measured at least once. However, it is not easy to obtain a closed gap close to that in the actual use state. In addition, measurement of the closed gap tends to cause an error and takes a comparatively long period of time. For these reasons, it is difficult to stably measure the tension of the piston ring at high precision within a short period of time.

OBJECT AND SUMMARY OF THE INVENTION

It is, therefore, an object of the present invention to provide a tension measuring apparatus and method for a piston ring, which can stably measure the tension of the piston ring at high precision within a short period of time.

With a piston ring tension measuring apparatus according to the present invention, a large initial frictional force between a piston ring and a belt body wound on it can be removed by applying an impact to them with an impact mechanism. Since a small frictional force between the piston ring and the belt body can be sufficiently removed by applying vibrations with the first and second vibration mechanisms, the frictional force between the piston ring and the belt body can be considerably decreased.

If one end portion and the other end portion of the belt body are moved relative to each other with a drive mechanism until a state identical to that obtained when the piston ring is inserted in the cylinder is obtained, and their relative positions are obtained, the tension obtained when the piston ring is inserted in the cylinder can be measured with a measurement mechanism from the next measurement by only moving the one end portion and the other end portion of the belt body relative to each other to the obtained positions by the drive mechanism. Therefore, the closed gap need not be measured every time measurement is performed.

Accordingly, with the piston ring tension measuring apparatus according to the present invention, the tension of the piston ring can be stably measured at high precision within a short period of time.

With the piston ring tension measuring method according to the present invention, positions where one end portion and the other end portion of a belt body must be moved relative to each other by a drive mechanism are obtained in advance by using a master gauge having a projection with an outer diameter equal to the inner diameter of the cylinder and a width and a surface state equal to those of the piston ring. When measuring the tension of the piston ring, one end portion and the other end portion of the belt body are moved to these positions relative to each other. Therefore, the tension of the piston ring can be measured in a state close to the actual use state, and the closed gap need not be measured at all.

Accordingly, with the piston ring tension measuring method according to the present invention, the tension of the piston ring can be stably measured at high precision within a short period of time.

DETAILED DESCRIPTION OF THE PREFERRED EMBODIMENT

Figure 1:
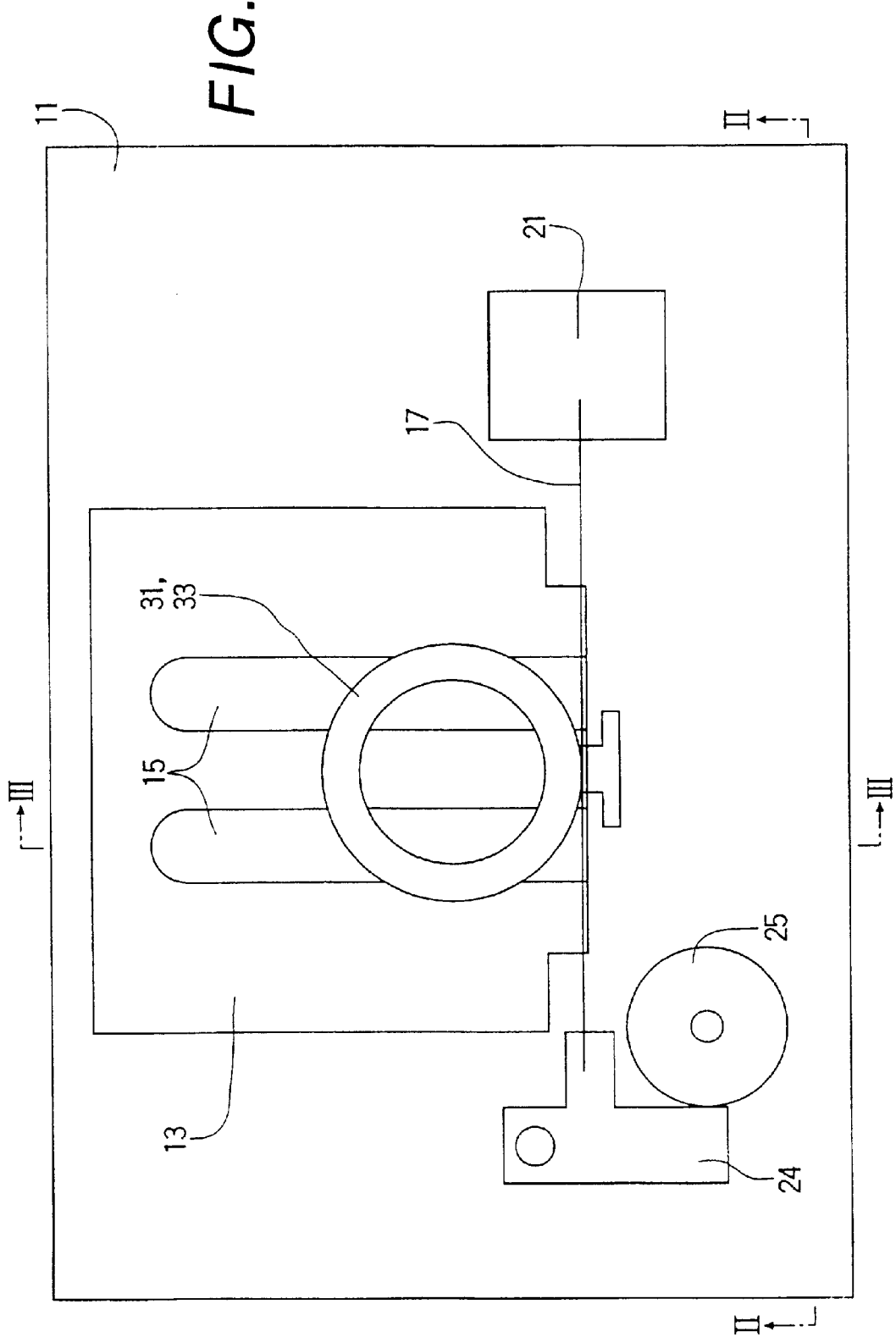
FIG. 1 is a plan view of a tension measuring apparatus according to an embodiment of the present invention.
Figure 2:
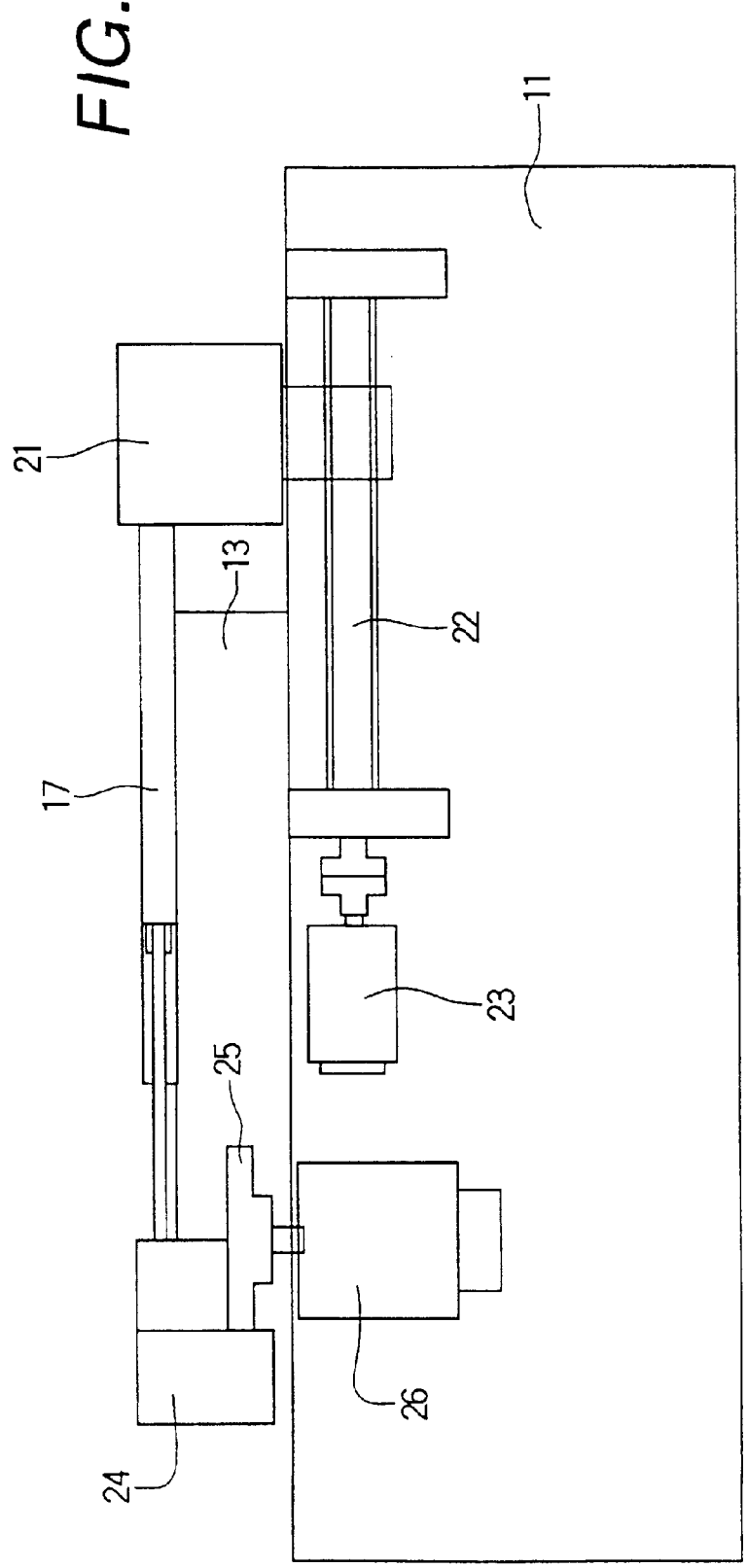
FIG. 2 is a side sectional view taken along the line II—II of FIG. 1.
Figure 3:
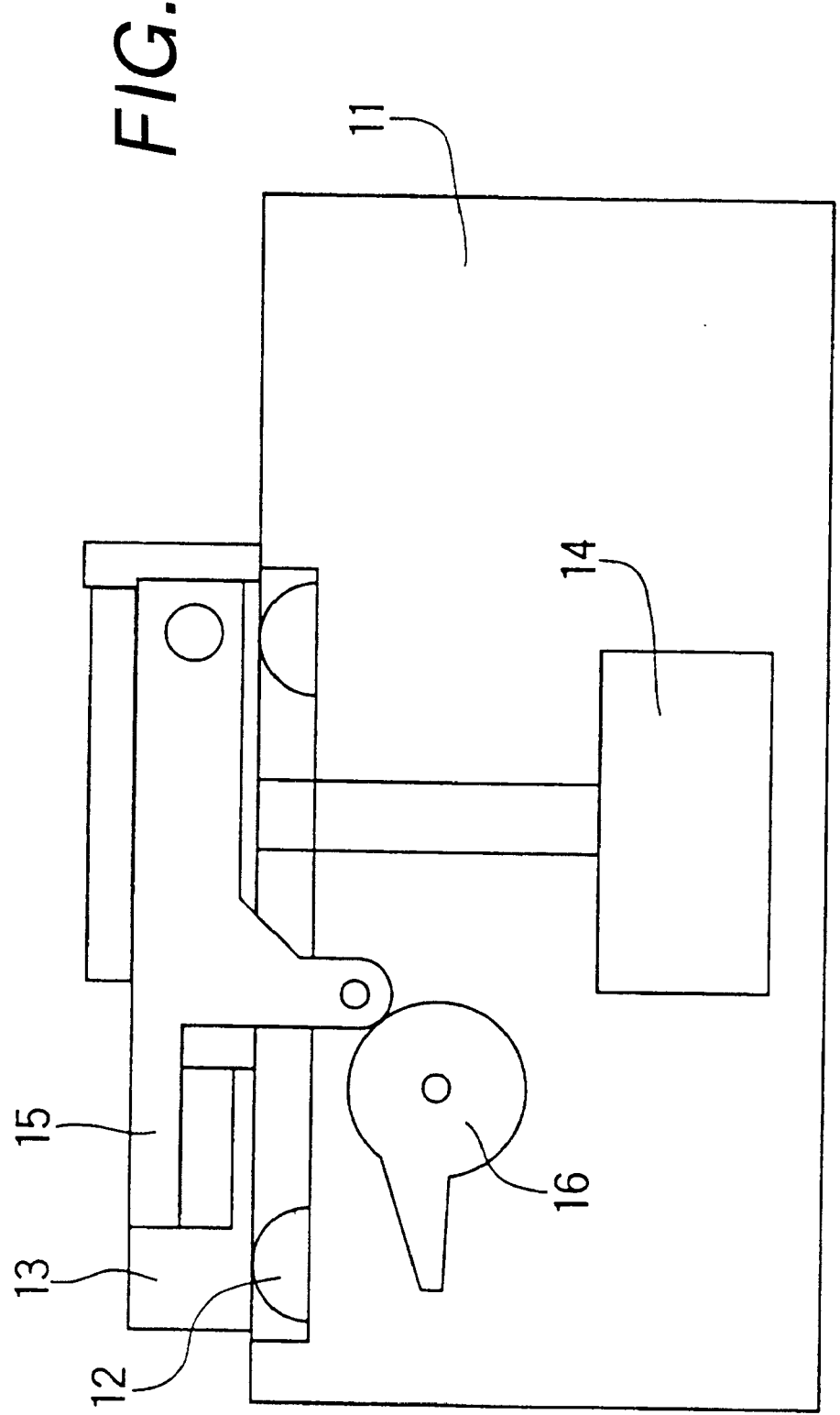
FIG. 3 is a side sectional view taken along the line III—III of FIG. 1.
Figure 4:
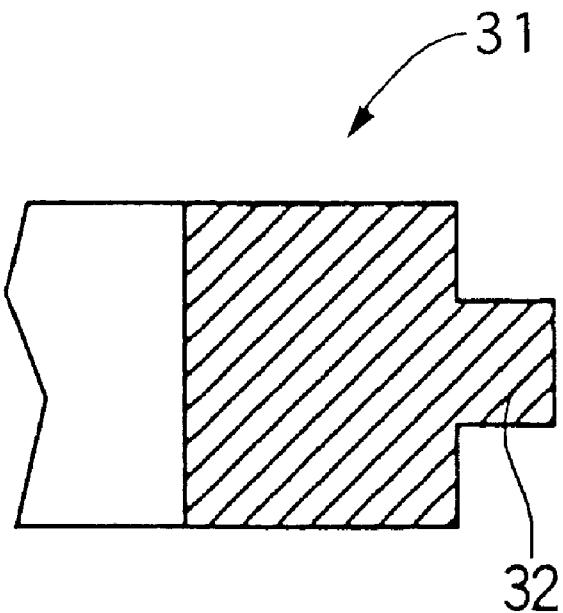
FIG. 4 is a side sectional view of the main part of a master gauge used in this embodiment.

An embodiment of the present invention will be described with reference to FIGS. 1 to 5. As shown in FIGS. 1 to 3, in the tension measuring apparatus of this embodiment, a vibrating plate 13 is supported on a base 11 with mounts 12 and a vibration generator 14 for vibrating the vibrating plate 13 is arranged in the base 11.

Vertical moving plates 15 are fitted in the notches of the vibrating plate 13, and a cam 16 for vertically moving the vertical moving plates 15 and a motor (not shown) for rotating the cam 16 are arranged in the base 11. In the stop state, the upper surfaces of the vertical moving plates 15 are located slightly below the upper surface of the vibrating plate 13.

A load cell 21 is arranged on the base 11 on one side of the vibrating plate 13. The load cell 21 fixes a thin steel belt 17 at its one end portion to measure its tension. A ball screw 22 for moving the load cell 21 in a direction to come close to or separate from the vibrating plate 13, and a motor 23 for rotating the ball screw 22 are arranged in the base 11.

The tensile force of the thin steel belt 17 measured by the load cell 21, and the position of the load cell 21 are numerically displayed on a display (not shown). A belt holder 24 for holding the other end portion of the thin steel belt 17, and a cam 25 for applying a vibration to the belt holder 24 are arranged on the base 11 on the other end portion of the vibrating plate 13. A motor 26 for rotating the cam 25 is arranged in the base 11.

To measure the tension of the piston ring by using the tension measuring apparatus of this embodiment as described above, first, a master gauge 31 shown in FIG. 4 is prepared. The master gauge 31 has a projection 32 with an outer diameter equal to the inner diameter of a cylinder in which a piston mounted with the piston ring is to be inserted, and a width and surface state equal to those of the piston ring.

The master gauge 31 is placed on the vibrating plate 13 and vertical moving plates 15, and the thin steel belt 17 is wound on the projection 32 of the master gauge 31. The motor connected to the cam 16 is driven to rotate the cam 16. The cam 16 is rotated to move the vertical moving plates 15 upward, thereby lifting the master gauge 31 and thin steel belt 17.

Thereafter, when the cam 16 is further rotated, the vertical moving plates 15 are quickly moved downward. The master gauge 31 and the thin steel belt 17 collide against the vibrating plate 13 to apply an impact to them. As a result, the initial large frictional force between the master gauge 31 and the thin steel belt 17 wound on it is removed. The upward moving amount of the vertical moving plates 15 is adjusted by changing the shape of the cam 16, and the speed of the vertical movement is adjusted by changing the rotation speed of the motor.

When the master gauge 31 and the thin steel belt 17 are lifted by the vertical moving plates 15, the thin steel belt 17 is twisted. The vertical moving plates 15 are actuated only when removing the initial large frictional force between the master gauge 31 and the thin steel belt 17 wound on it, and are not actuated when measuring the tensile force by the load cell 21.

When the vertical moving plates 15 are actuated, the vibrating plate 13 is vibrated by the vibration generator 14 simultaneously, to vibrate the master gauge 31 and the thin steel belt 17 on the vibrating plate 13. Even small frictional forces between the master gauge 31 and the thin steel belt 17, and between the vibrating plate 13 and the master gauge 31 are then removed. The frequency and strength of the vibration are adjusted by changing the output from the vibration generator 14.

The motor 26 is driven to rotate the cam 25, so that the belt holder 24 is vibrated to vibrate the thin steel belt 17. Even a small frictional force between the master gauge 31 and the thin steel belt 17 is then removed. The amplitude and frequency of the vibration at this time are adjusted by changing the shape of the cam 25 and by changing the rotation speed of the motor 26, respectively.

While applying the vibration generated by the vibration generator 14 and the vibration generated by rotation of the motor 26, the load cell 21, i.e., one end portion of the thin steel belt 17, is moved by the motor 23 and the ball screw 22 until the tensile force measured by the load cell 21 becomes a predetermined value, e.g., the center value of the defined tension, so that the position of the load cell 21 numerically displayed at this time is obtained.

As described above, since the projection 32 of the master gauge 31 has an outer diameter equal to the inner diameter of the cylinder in which the piston mounted with the piston ring is to be inserted, when the load cell 21 is at a position where the tensile force measured by it becomes a predetermined value, the closed gap of the piston ring is in a cylinder insertion state.

The tensile force is measured by the load cell 21 while applying the vibration generated by the vibration generator 14 and the vibration generated by the rotation of the motor 26. Therefore, in order to remove the influence of vibration on measurement, the average of the tensile force within a predetermined period of time is calculated, and an average of measurement data of several times of measurement is numerically displayed on the display as the measurement value.

Figure 5:
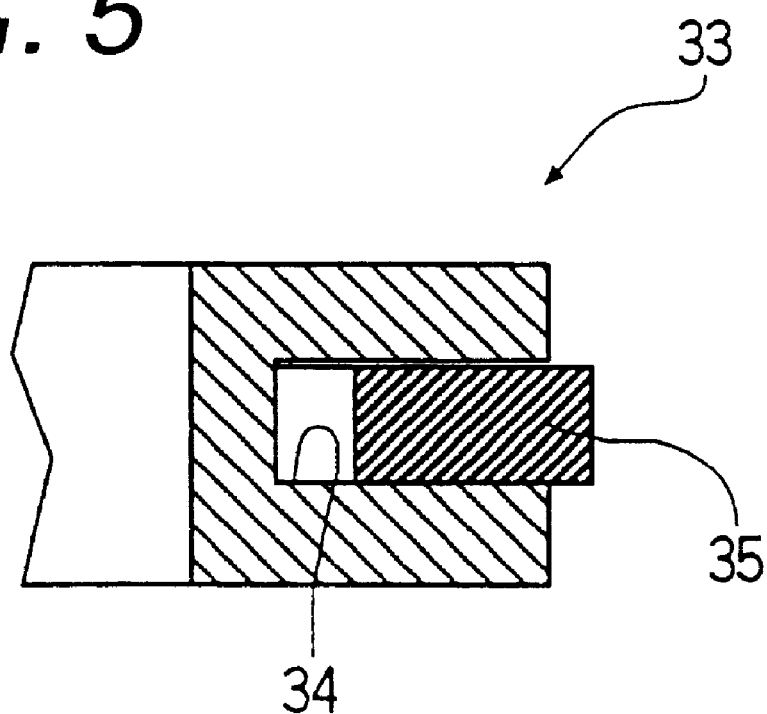
FIG. 5 is a side sectional view of the main part of a ring holder used in this embodiment.

A ring holder 33 shown in FIG. 5 is prepared. The ring holder 33 has a groove 34 in its outer circumferential surface. A piston ring 35, the tension of which is to be measured, is mounted in the groove 34. The ring holder 33 in which the piston ring 35 is mounted is placed on the vibrating plate 13 and vertical moving plates 15, and the thin steel belt 17 is wound on the piston ring 35.

Thereafter, the initial large frictional force between the piston ring 35 and the thin steel belt 17 wound on it is removed by an impact applied by the vertical moving plates 15, in the same manner as the frictional force between the master gauge 31 and the thin steel belt 17. Even small frictional forces between the piston ring 35 and the thin steel belt 17, between the ring holder 33 and the piston ring 35 and between the ring holder 33 and the vibrating plate 13 are removed by the vibration generated by the vibration generator 14 and the vibration generated by rotation of the motor 26.

If the piston ring 35 has a complicated shape, like a 3-piece oil ring, a frictional force is generated not only between the piston ring 35 and the thin steel belt 17 but also between the piston ring 35 and the groove 34 of the ring holder 33. Any of these frictional forces can be removed by the impact and vibration described above.

Thereafter, while applying the vibration generated by the vibration generator 14 and the vibration generated by rotation of the motor 26, the load cell 21 is moved to a position obtained in advance by using the master gauge 31, and the tensile force applied to the thin steel belt 17 is measured by the load cell 21. At this time, the closed gap of the piston ring 35 is in a cylinder insertion state.

As is apparent from the above description, in this embodiment, despite that the closed gap of the piston ring 35 is not measured at all, the tension of the piston ring 35, which has a closed gap in the cylinder insertion state, is measured.

In the above embodiment, only the load cell 21 is moved to apply a tensile force to the thin steel belt 17. However, only the belt holder 24 may be moved, and its position may be obtained. Alternatively, both the load cell 21 and the belt holder 24 may be moved, and their positions relative to each other may be obtained.

What is claimed is:

1. A tension measuring apparatus for a piston ring, which applies a tensile force to a belt body wound on said piston ring and, when a diameter of said piston ring is reduced until a closed gap reaches a value obtained when said piston ring is inserted in a cylinder, determines the tensile force as the tension of said piston ring, characterized by comprising:

a drive mechanism for moving one end portion and the other end portion of said belt body relative to each other in a direction to enlarge and reduce the diameter of said piston ring, thereby applying the tensile force;

a first vibrating mechanism for applying a vibration to said piston ring and said belt body at a wound portion;

an impact mechanism for applying an impact to said piston ring and said belt body at said wound portion;

a measurement mechanism connected to said one end portion to measure the tensile force; and a second vibrating mechanism connected to said other end portion to apply vibration to said belt body.

2. An apparatus according to claim 1, characterized in that said drive mechanism comprises:

a ball screw for moving a fixing mechanism that fixes said one end portion; and a motor for rotating said ball screw.

3. An apparatus according to claim 1, characterized in that said impact mechanism comprises:

a vertical moving plate on which said piston ring is to be placed;

a cam for vertically moving said vertical moving plate;

a base plate for causing collision of said piston ring placed on said vertical moving plate upon vertical movement; and a motor for rotating said cam.

4. An apparatus according to claim 1, characterized in that said measurement mechanism is a load cell.

5. An apparatus according to claim 1, characterized in that said second vibrating mechanism comprises:

a cam for vibrating a holding mechanism that holds said other end portion; and a motor for rotating said cam.

6. A tension measuring method for a piston ring of claim 1, characterized by comprising the steps of:

preparing a master gauge having a projection with an outer diameter equal to an inner diameter of said cylinder and a width and surface state equal to those of said piston ring;

winding said belt body on said projection and moving one end portion and the other end portion of said belt body relative to each other, thereby obtaining positions of said one end portion and said other end portion relative to each other where the tensile force becomes the tension that said piston ring should have; and winding said belt body on said piston ring, moving one end portion and the other end portion of said belt body relative to each other to the positions and measuring the tensile force.

* * * * *